United States Patent
Hsiung

(10) Patent No.: US 8,931,528 B2
(45) Date of Patent: Jan. 13, 2015

(54) STOCK FEEDER FOR WOODWORKING EQUIPMENT

(71) Applicant: Tai-Yuan Hsiung, Taichung (TW)

(72) Inventor: Tai-Yuan Hsiung, Taichung (TW)

( * ) Notice: Subject to any disclaimer, the term of this patent is extended or adjusted under 35 U.S.C. 154(b) by 88 days.

(21) Appl. No.: 13/866,078

(22) Filed: Apr. 19, 2013

(65) Prior Publication Data

US 2013/0315692 A1 Nov. 28, 2013

(30) Foreign Application Priority Data

May 23, 2012 (CN) ...................... 2012 2 0233854 U

(51) Int. Cl.
| | |
|---|---|
| *B27B 25/00* | (2006.01) |
| *B27C 1/12* | (2006.01) |
| *B27B 25/10* | (2006.01) |
| *B27B 31/00* | (2006.01) |
| *H02K 5/18* | (2006.01) |
| *H02K 11/00* | (2006.01) |
| *B27B 25/02* | (2006.01) |
| *B27B 25/06* | (2006.01) |
| *H02K 9/06* | (2006.01) |

(52) U.S. Cl.
CPC ............... *B27B 25/10* (2013.01); *B27B 31/003* (2013.01); *H02K 5/18* (2013.01); *H02K 11/0073* (2013.01); *B27B 25/02* (2013.01); *B27B 25/06* (2013.01); *H02K 9/06* (2013.01)

USPC .................. 144/248.3; 144/242.1; 144/246.1; 144/247; 226/178; 226/188; 198/722

(58) Field of Classification Search
CPC ...... B25B 25/10; B27B 25/02; B27B 31/003; H02K 11/0073; H02K 5/18
USPC ......... 414/14; 144/248.4, 246.1, 242.1, 248.3; 310/52–60
See application file for complete search history.

(56) References Cited

U.S. PATENT DOCUMENTS

| | | | | |
|---|---|---|---|---|
| 4,483,378 A | * | 11/1984 | Chang et al. ............... | 144/248.4 |
| 4,875,512 A | * | 10/1989 | Lin ............................ | 144/248.4 |
| 5,799,854 A | * | 9/1998 | Lin ............................. | 226/188 |

* cited by examiner

*Primary Examiner* — Saul Rodriguez
*Assistant Examiner* — Ronald Jarrett

(57) ABSTRACT

A stock feeder for woodworking equipment includes a base, a cross clamp, a horizontal bar unit, a vertical bar unit, a feeding unit, and an electrical unit. The electrical unit has an electrical unit main body and a variable-frequency drive. The electrical unit main body has a first housing, a plurality of heat dissipation grooves provided on the outer periphery of the first housing, and a power fan which is independently mounted on a top portion of the first housing and in communication with the heat dissipation grooves. The variable-frequency drive has a second housing, a variable-frequency circuit sealed in the second housing, and a control panel exposed outside the second housing. The second housing has an outer surface provided with a plurality of heat dissipation slots corresponding in position to and in communication with the heat dissipation grooves of the electrical unit main body.

12 Claims, 8 Drawing Sheets

STOCK FEEDER FOR WOODWORKING EQUIPMENT

BACKGROUND OF THE INVENTION

1. Technical Field

The present invention relates to a stock feeder and, more particularly, to a stock feeder configured for woodworking equipment and featuring both high dust-tightness and high heat-dissipation efficiency.

2. Description of Related Art

Generally, a stock feeder is used in a woodworking process to feed and hold steady the wood board being worked on. An existing stock feeder typically includes a base disposed on a workbench, a vertical bar inserted in the base, a clamp mounted around the vertical bar, a horizontal bar extending through the clamp and held perpendicular to the vertical bar, a feeding unit pivotally connected to one end of the horizontal bar, and an electrical unit provided on the feeding unit. The bottom portion of the feeding unit is provided with a plurality of feed wheels for holding down a board. The electrical unit has a motor for driving the feed wheels into rotation, a fixing mount provided on the housing of the motor, and a variable-frequency drive (VFD) hung on the fixing mount and configured for changing the rotating speed of the motor.

By operating the handwheel on the horizontal bar and the handwheel on the vertical bar, an operator can move the feeding unit to a predetermined location, so as for the feed wheels to hold down and feed a board to facilitate the woodworking process. While the existing stock feeders are well capable of feeding and holding steady wood boards, the following drawbacks need to be overcome:

1. The VFD, which is directly hung on the exterior of the electrical unit, is both bulky and unsightly. Moreover, although the heat dissipation holes on the VFD housing do provide heat dissipation to some extent, the same holes serve also as a path through which dust, liquid, and like foreign matter can intrude into the internal circuit. Therefore, the externally hung VFD is not suitable for use in a dusty environment and may be easily damaged if so used.

2. The wires to the VFD and to the electrical unit are all exposed and hence have rather low safety coefficients.

3. Both the motor and the VFD in the electrical unit rely on a centrifugal fan to dissipate heat. However, as the fan is fixed to and designed to move synchronously with the rotor of the motor, the rotating speed of the fan will be low if the motor operates at low speed. And if the fan fails to provide forced cooling, heat dissipation efficiency will be reduced significantly.

4. In order to cope with a wood board of uneven thickness, the operator has to adjust the working gap between the feed wheels and the workbench. Nevertheless, the entire feeding unit is so heavy that it may be inadvertently dropped on and thus hit the workbench. Should that happen, the reaction force of the weight of the feed wheel sets will act on the wheel axles, and should that happen again and again, the meshing internal components (e.g., gears) may deform and eventually break.

5. The feed wheels of a conventional stock feeder generally operate on belt transmission. The belts, however, tend to get loose and deform and therefore have a relatively large deformation allowance. As time goes on, the gaps between components will increase, too, which not only causes noise, but also leads to frequent damage, and consequently frequent replacement, of components, incurring a high cost of use.

BRIEF SUMMARY OF THE INVENTION

The primary object of the present invention is to provide a stock feeder for woodworking equipment, wherein the stock feeder is highly dust-proof and highly efficient in heat dissipation.

The secondary object of the present invention is to provide the foregoing stock feeder, wherein a power fan is independently provided and is not connected to the power end of the electrical unit. Therefore, heat dissipation efficiency will not be affected when the electrical unit operates at a low rotating speed. In addition, the housing of the electrical unit and the housing of the VFD are provided with corresponding heat dissipation grooves and slots that dissipate heat by means of the same power fan so as to achieve optimal heat dissipation efficiency.

Another object of the present invention is to provide the foregoing stock feeder, wherein each feed wheel set is provided with a resilient lifting mechanism for lifting the wheels automatically and resiliently under the reaction force of the force of gravity. Furthermore, power is transmitted to the wheels of each feed wheel set by chains, which feature stabler power transmission and longer service lives than belts.

Yet another object of the present invention is to provide the foregoing stock feeder, wherein the chains in each feed wheel set are respectively enclosed in casings to keep off foreign matter, thereby preventing the chains from getting stuck.

To achieve the above objects, the present invention provides a stock feeder for woodworking equipment, wherein the stock feeder includes a base, a cross clamp, a horizontal bar unit, a vertical bar unit, a feeding unit, and an electrical unit. The cross clamp has a horizontal clamping sleeve and a vertical clamping sleeve. The horizontal bar unit extends through the horizontal clamping sleeve. The vertical bar unit extends through the vertical clamping sleeve and has its bottom end installed on the base. The feeding unit is pivotally provided on one side of the horizontal bar unit and includes a unit body and a plurality of feed wheel sets disposed in a bottom portion of the unit body. Each feed wheel set has a main shaft, two axles respectively and pivotally connected to two lateral sides of the main shaft and parallel to the main shaft, two wheels each fixedly provided at the front end of one of the axles, a plurality of gears fixedly provided on the main shaft and on the axles, and a plurality of transmission elements mounted around the gears. The electrical unit is configured for driving the feed wheel sets of the feeding unit to rotate and thereby carry out a feeding operation. The electrical unit has an electrical unit main body and a variable-frequency drive (VFD) provided on one side of the electrical unit main body. The electrical unit main body has a first housing, a plurality of heat dissipating fins and heat dissipation grooves alternately arranged on the outer periphery of the first housing, a power fan independently mounted on a top portion of the first housing, and a fan cover covering the power fan, wherein the power fan is in communication with the heat dissipation grooves. The VFD has a second housing, a variable-frequency circuit sealed in the second housing, and a control panel exposed outside the second housing. The outer surface of the second housing is provided with a plurality of alternately arranged heat dissipating ribs and heat dissipation slots. The heat dissipation slots correspond in position to and are in communication with the heat dissipation grooves of the electrical unit main body.

BRIEF DESCRIPTION OF THE SEVERAL VIEWS OF THE DRAWINGS

The structure as well as a preferred mode of use, further objects, and advantages of the present invention will be best understood by referring to the following detailed description of some illustrative embodiments in conjunction with the accompanying drawings, in which.

DETAILED DESCRIPTION OF THE INVENTION

Figure 1:
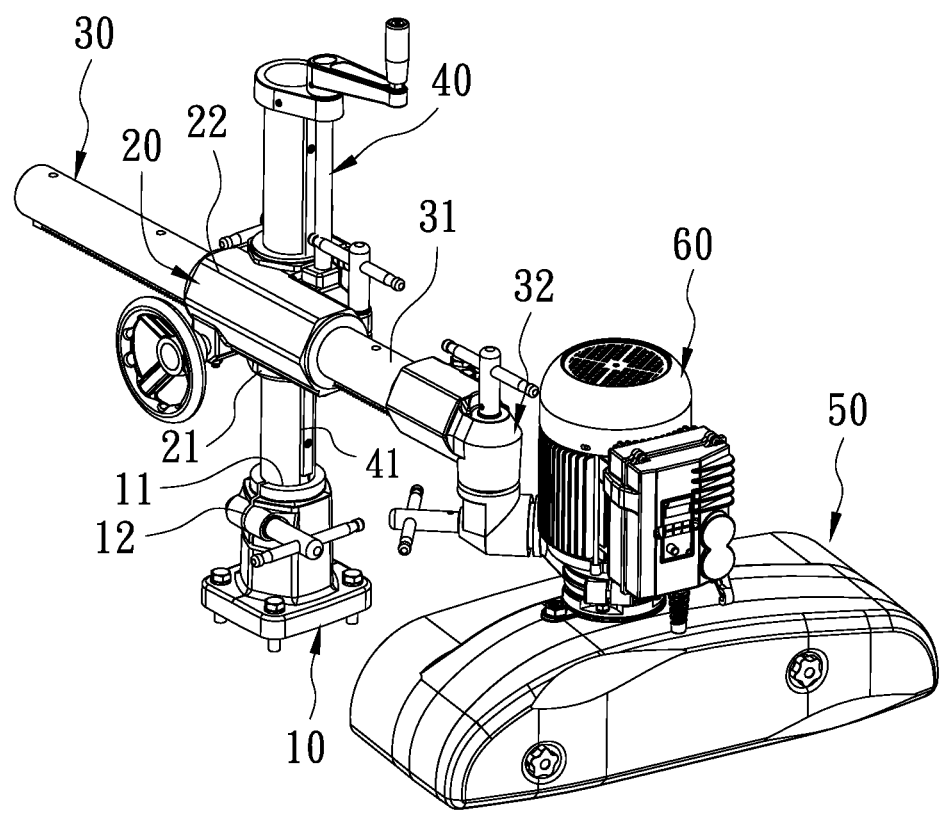
FIG. 1 is a perspective view of a stock feeder for woodworking equipment according to the present invention.

In one embodiment of the present invention as shown in FIG. 1, a stock feeder for woodworking equipment includes a base 10, a cross clamp 20, a horizontal bar unit 30, a vertical bar unit 40, a feeding unit 50, and an electrical unit 60.

The base 10 includes an insertion groove 11 and an opening 12 extending along the groove wall of the insertion groove 11.

The cross clamp 20 includes a vertical clamping sleeve 21 and a horizontal clamping sleeve 22 which are arranged in a cross shape.

The horizontal bar unit 30 includes a horizontal bar 31 extending through the horizontal clamping sleeve 22 and a clamp assembly 32 mounted at one end of the horizontal bar 31. The clamp assembly 32 connects the horizontal bar 31 to the electrical unit 60 and the feeding unit 50 and is configured for adjusting the working angle of the feeding unit 50.

The vertical bar unit 40 includes a vertical bar 41 extending through the vertical clamping sleeve 21.

Referring to FIG. 5 to FIG. 8, the feeding unit 50 is pivotally provided at one end of the horizontal bar unit 30 and includes a unit body 51, a protective cover 53, a gear set 54, a plurality of feed wheel sets 55 disposed in a bottom portion of the unit body 51 and covered by the protective cover 53, a plurality of elastic elements 56, and a plurality of casings 57.

The feed wheel sets 55 mounted in the bottom portion of the unit body 51 each have a main shaft 550; two axles 551 respectively and pivotally connected to two lateral sides of the main shaft 550 and parallel to the main shaft 550; two wheels 552 respectively and fixedly provided at the front ends of the axles 551; a plurality of gears 553, 554, 555 fixedly provided on the main shaft 550 and on the axles 551; and a plurality of transmission elements 556 mounted around the gears 554, 555.

In the present invention, the transmission elements 556 are transmission chains each composed of a plurality of links 5561 sequentially linked together so as to provide stable and reliable power transmission.

Figure 9:
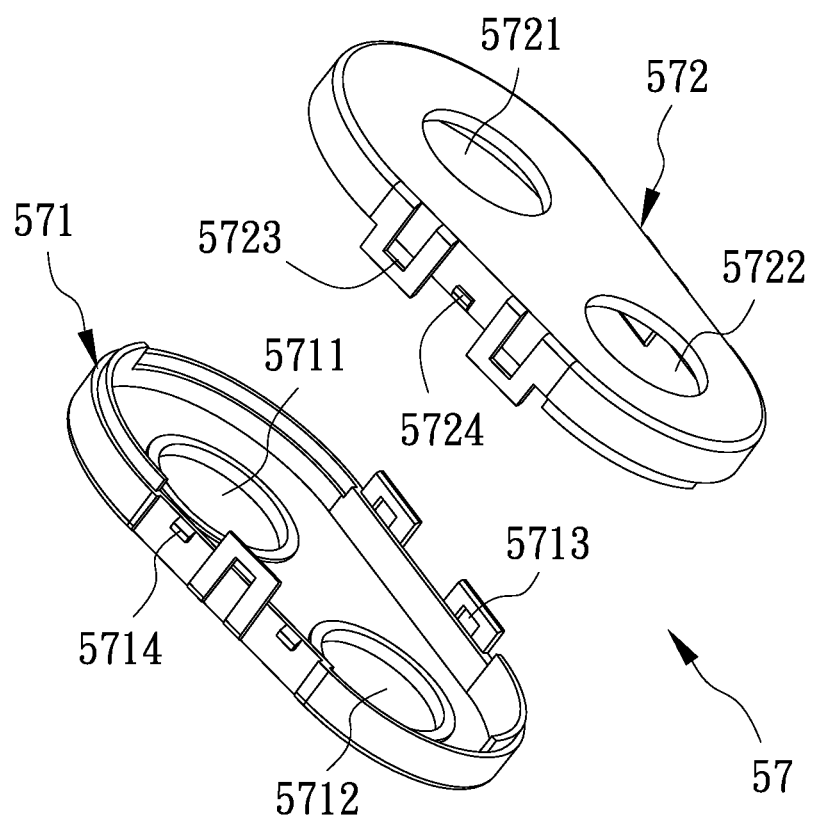
FIG. 9 is an exploded perspective view of a first casing portion and a second casing portion according to the present invention.

Referring to FIG. 9, each casing 57 has a first casing portion 571 and a second casing portion 572 and is configured for enclosing one transmission element 556.

As shown in FIG. 9, the first (second) casing portion 571 (572) has two through holes 5711, 5712 (5721, 5722), at least one fastening lug 5713 (5723), and at least one engaging block 5714 (5724). The first and second casing portions 571, 572 in FIG. 9 are provided with a plurality of alternately arranged fastening lugs 5713, 5723 and engaging blocks 5714, 5724.

Figure 5:
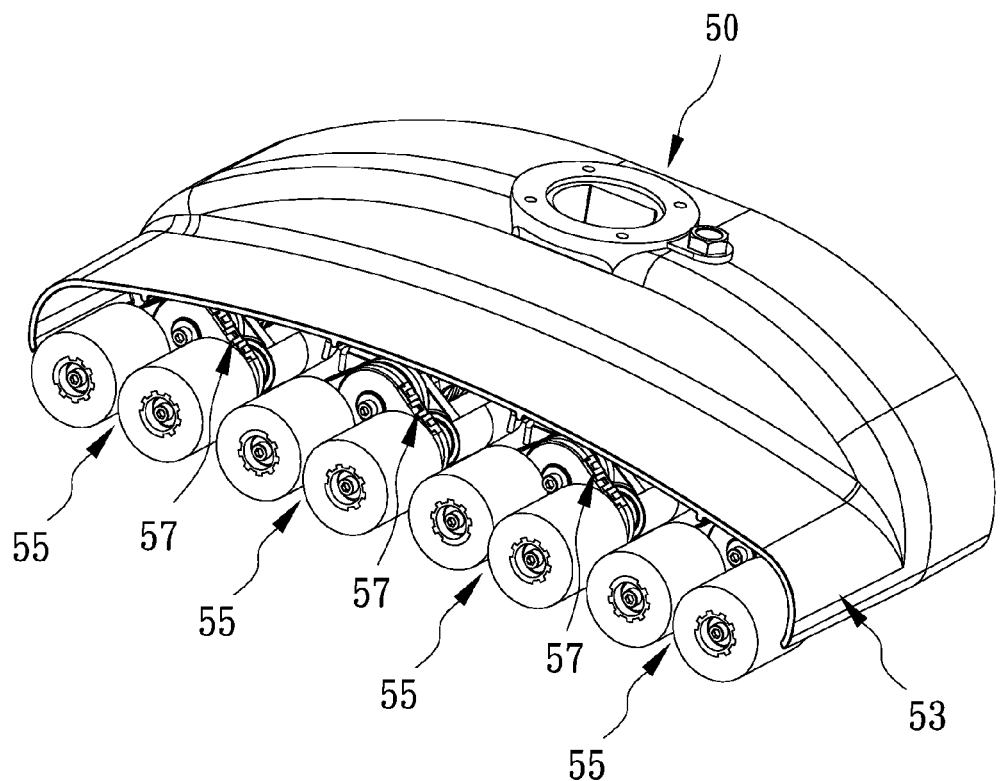
FIG. 5 is a perspective view of a feeding unit according to the present invention.
Figure 6:
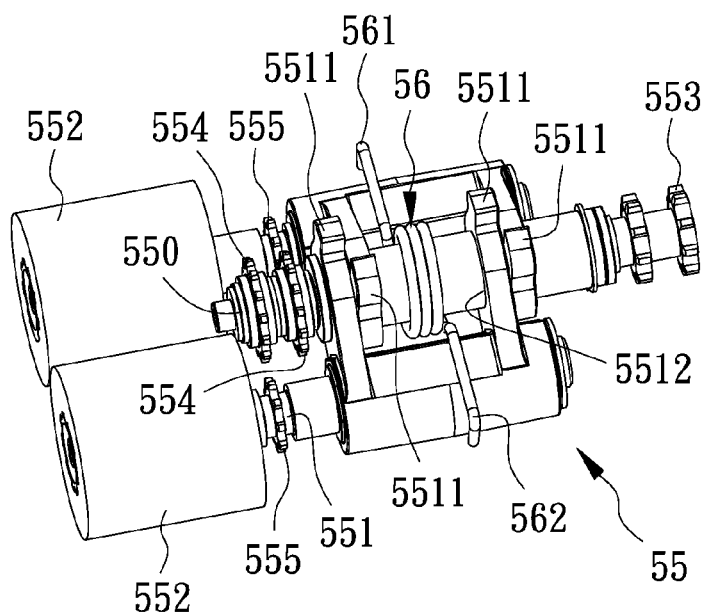
FIG. 6 is a perspective view of a feed wheel set according to the present invention.
Figure 7:
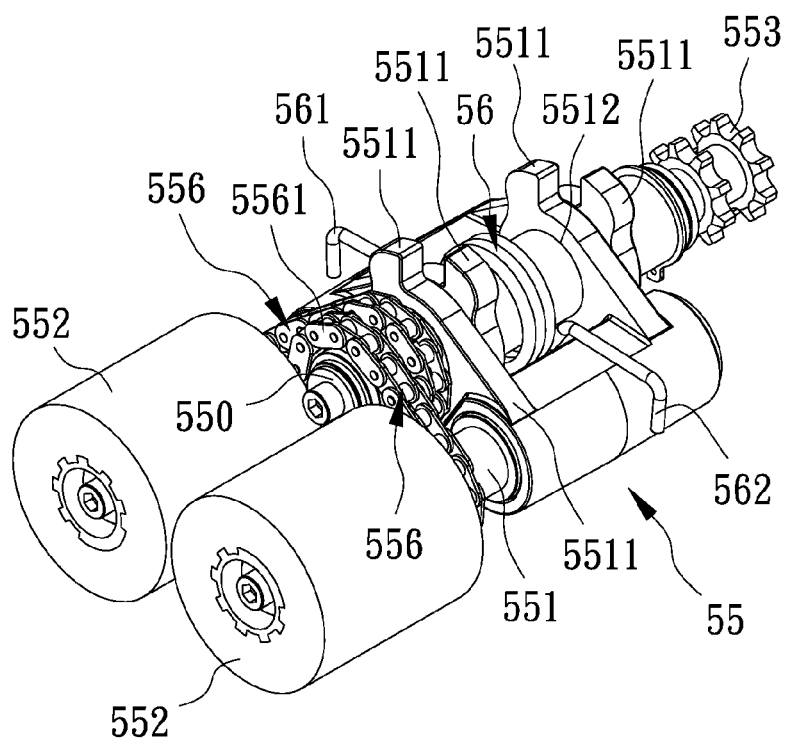
FIG. 7 is another perspective view of the feed wheel set shown in FIG. 6, illustrating in particular how transmission chains are mounted around the gears on a main shaft and the gears on two axles.

Referring to FIGS. 5, 7, and 9, the first and second casing portions 571, 572 of each casing 57 are closed on each other to enclose the corresponding transmission element 556. In addition, the through holes 5711, 5721 of the first and second casing portions 571, 572 are mounted around the corresponding main shaft 550 while the through holes 5712, 5722 of the first and second casing portions 571, 572 are mounted around the corresponding axle 551. The alternately arranged engaging blocks 5714, 5724 of the first and second casing portions 571, 572 are respectively engaged with the fastening lugs 5713, 5723, so as for the first and second casing portions 571, 572 to cover the corresponding transmission element 556, the corresponding gear 554, and the corresponding gear 555, preventing any component or foreign matter from falling into and getting stuck in the transmission element 556, the gear 554, or the gear 555. If not prevented, the ingress of a fallen component or foreign matter will hinder the operation of, or even cause damage to, related components.

Referring to FIGS. 6, 7, 10, and 11, each axle 551 of each feed wheel set 55 has a plurality of outwardly extending axle plates 5511, wherein each axle plate 5511 has an axle hole 5512. Each elastic element 56 has a front end 561 and a rear end 562. To assemble a feed wheel set 55, the axle holes 5512 on the axle plates 5511 of its two axles 551 and the main body of the corresponding elastic element 56 are sequentially mounted around its main shaft 550 such that the front end 561 and the rear end 562 of the elastic element 56 respectively press against the axles 551 flanking the main shaft 550.

Figure 8:
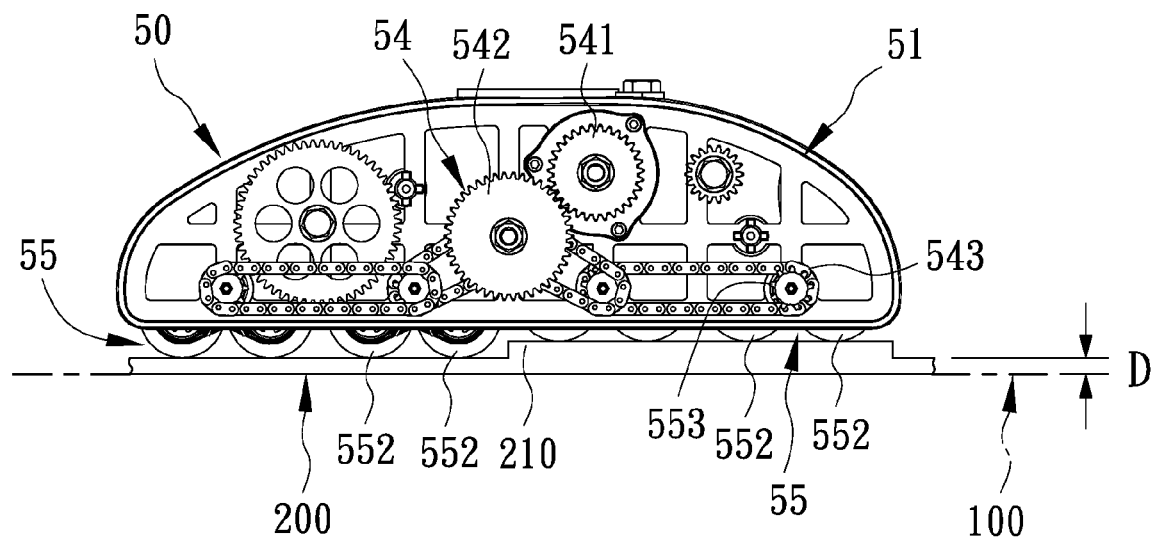
FIG. 8 is a side view of the feeding unit shown in FIG. 5.

As shown in FIG. 8, the gear set 54 includes a primary gear 541, a secondary gear 542 meshing with the primary gear 541, and a plurality of driving elements 543. The driving elements 543 are respectively connected to the secondary gear 542 and the gears 553 of the feed wheel sets 55. In the present invention, the driving elements 543 are transmission chains.

Figure 11:
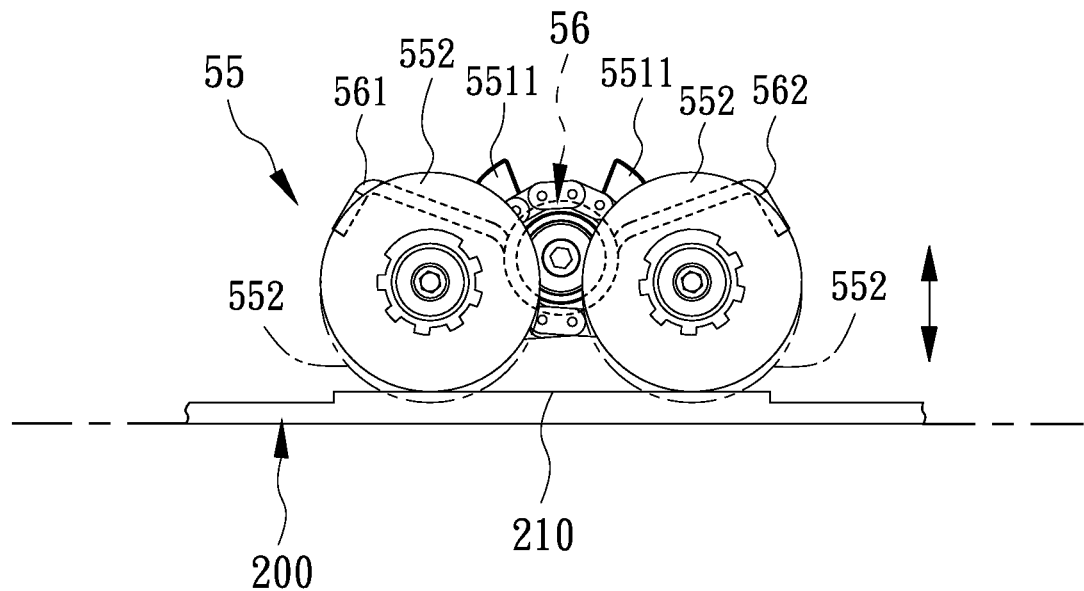
FIG. 11 is a side view illustrating a pushed-up state of the wheels of the feed wheel set shown in FIG. 6.

Referring to FIGS. 8 and 11, when a relatively thick portion 210 of a wood board 200 having uneven thickness passes under the feeding unit 50, the affected wheels 552 are pushed up by the relatively thick portion 210, but thanks to the pressing action of the elastic elements 56, the affected wheels 552 remain in pressing contact with the wood board 200, allowing the feeding operation to continue. In the meantime, the axles 551 corresponding to the affected wheels 552 will be elastically cushioned, which is a far cry from what will happen in a conventional feeding unit under the same circumstances. In a conventional feeding unit, the gears on the axles of the affected feed wheel sets will be subjected to a transient stress when the axles are pushed up, and the gears may break as a result. In the present invention, however, the gears 554, 555 on the main shaft 550 and on the axles 551 of an affected feed wheel set 55 will stay in proper meshing relationships (see FIG. 6) and will not be subjected to a stress large enough to break them; consequently, the gears 554, 555 are expected to have longer service lives than their prior art counterparts.

Referring again to FIG. 8, when an operator wishing to adjust the working gap D between the feeding unit 50 and a workbench 100 causes the entire feeding unit 50 to fall heavily on the workbench 100 by accident, the elastically lifting action of the elastic elements 56 provides elastic cushioning to the plummeting feed wheel sets 55. Thus, the gears are allowed to maintain their meshing relationships and are prevented from being broken by the transient heavy load.

Figure 2:
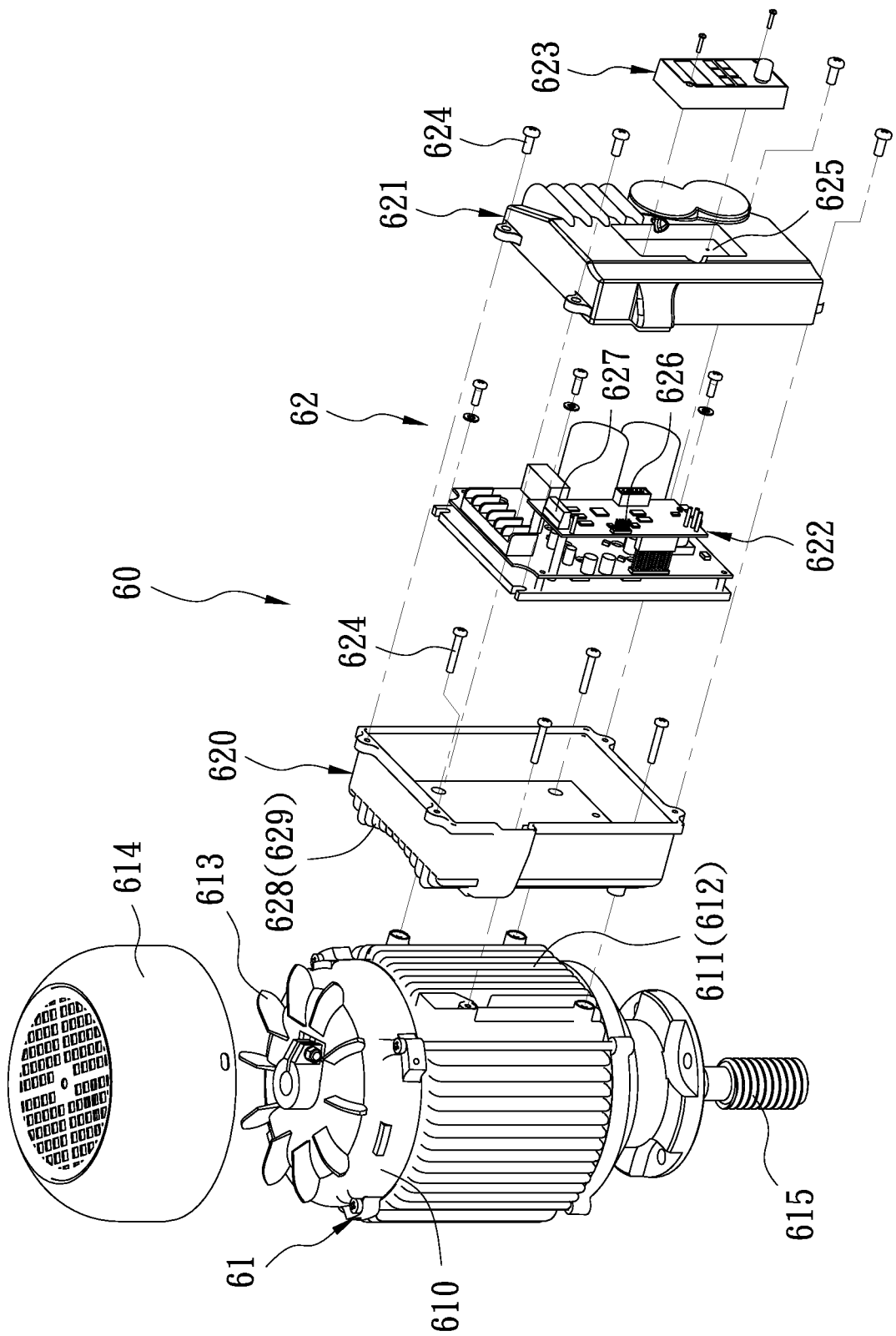
FIG. 2 is an exploded perspective view of an electrical unit according to the present invention.
Figure 3:
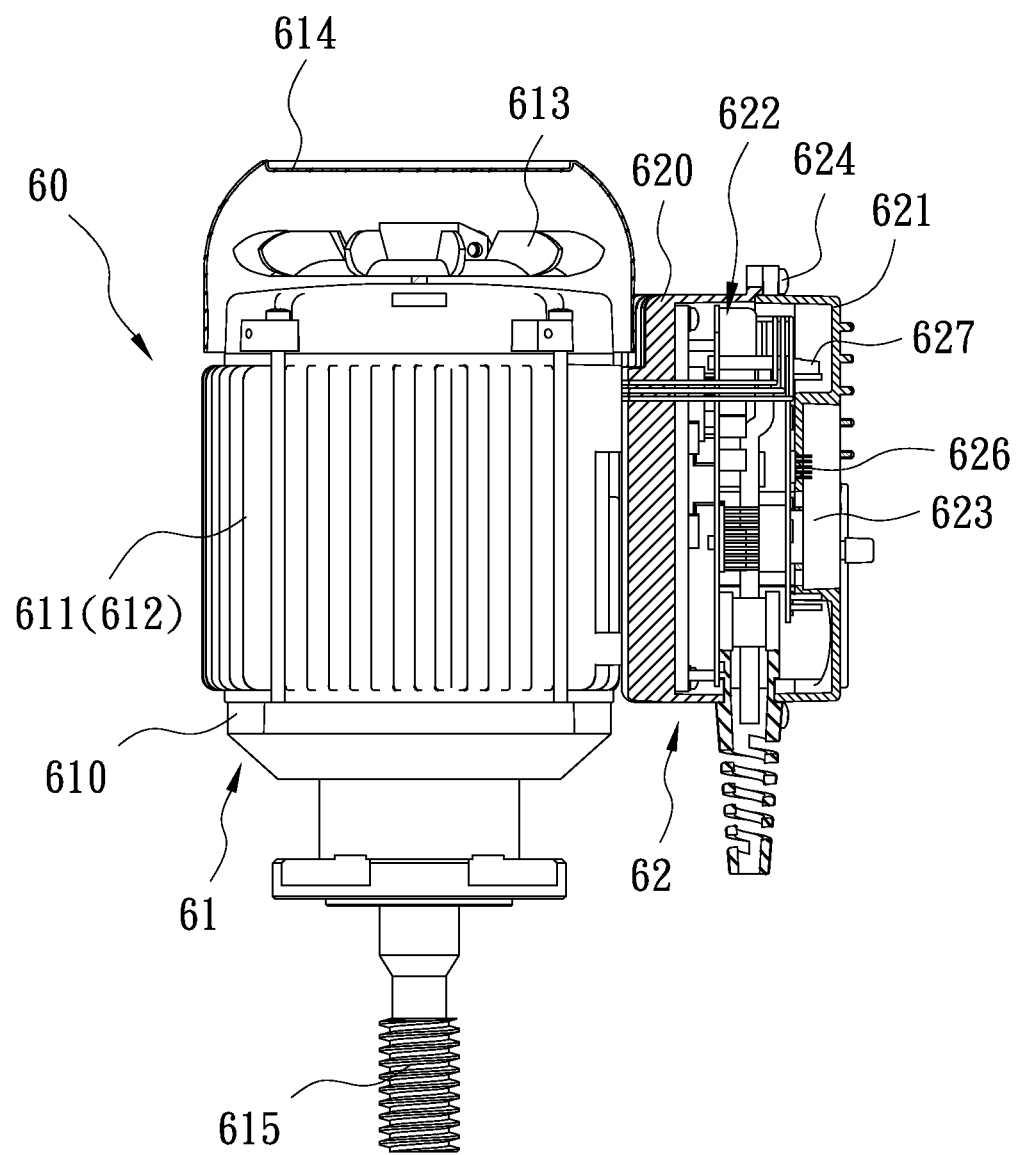
FIG. 3 is a partially sectional side view of the electrical unit shown in FIG. 2.

The electrical unit 60 is provided above the feeding unit 50. Referring to FIGS. 2 and 3, the electrical unit 60 has an electrical unit main body 61 (a motor) and a variable-frequency drive (VFD) 62 provided on one side of the electrical unit main body 61.

Figure 4:
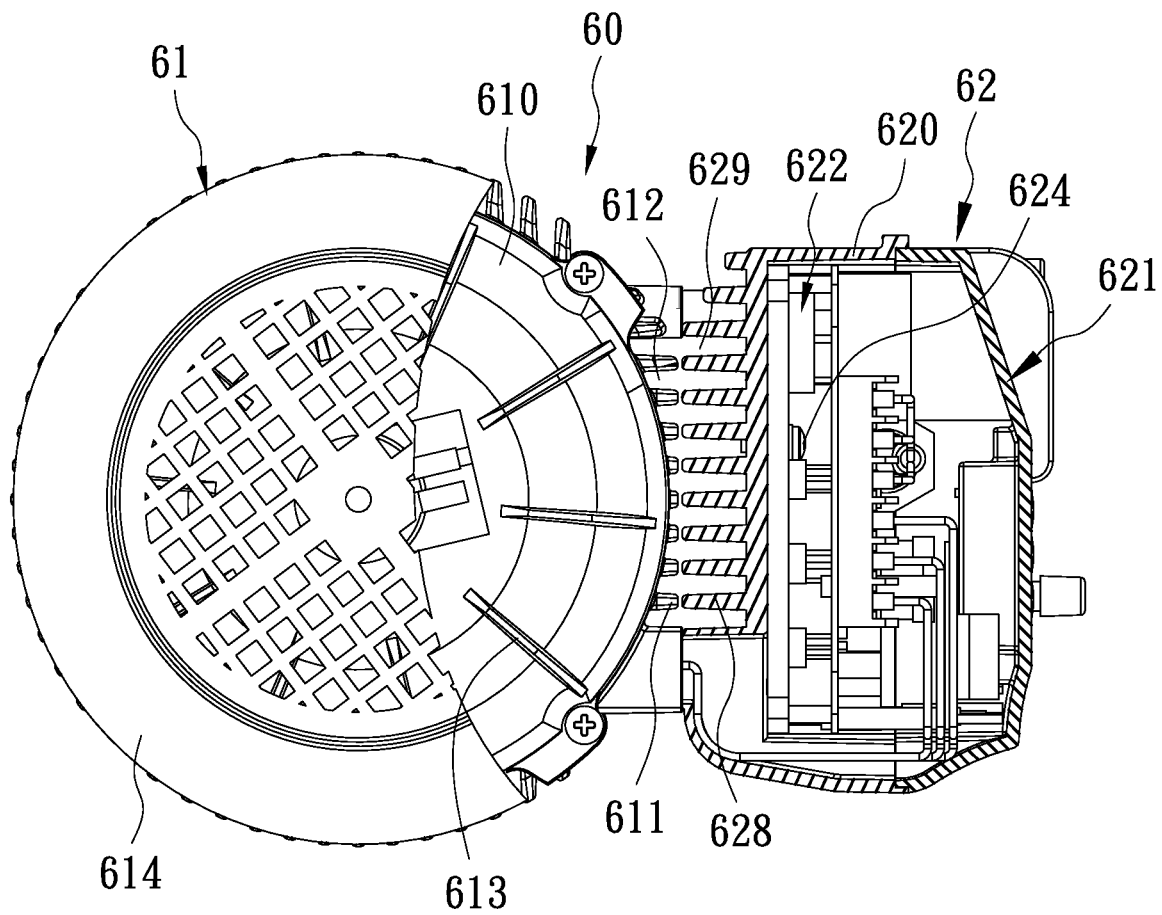
FIG. 4 is a partially sectional top view of the electrical unit shown in FIG. 2.

As shown in FIGS. 2 to 4, the electrical unit main body 61 has a first housing 610, a plurality of heat dissipating fins 611 and heat dissipation grooves 612 alternately arranged on the outer periphery of the first housing 610, a power fan 613 independently mounted on the exterior of the first housing 610, and a fan cover 614 covering the power fan 613, wherein the power fan 613 is in communication with the heat dissipation grooves 612. The electrical unit main body 61 has a power end 615, whose operation is independent of that of the power fan 613. Therefore, even if the electrical unit main body 61 operates at a low rotating speed, the rotating speed and cooling effect of the power fan 613 will remain constant to ensure heat dissipation efficiency.

The VFD 62 has a second housing 620, a cover 621, a variable-frequency circuit 622, a control panel 623, and a plurality of fasteners 624. The variable-frequency circuit 622 is provided with an overload protection circuit to prevent overheating and thereby protect the electrical unit main body 61 from burning.

Installation of the VFD 62 starts with fastening the second housing 620 to the electrical unit main body 61. Then, the cover 621 is closed on and fastened to the second housing 620 with the fasteners 624 to seal the variable-frequency circuit 622 in the second housing 620. Thus, the VFD 62 is connected to one side of the electrical unit main body 61 in an integral fashion that gives the electrical unit 60 a compact overall look.

The cover 621 has a cavity 625 on the outside. Once fully assembled, a control interface 626 of the variable-frequency circuit 622 extends into the cavity 625 of the cover 621, and the control panel 623 is disposed in the cavity 625 to cover and electrically connect with the control interface 626. Through the control panel 623, the settings and operation of the variable-frequency circuit 622 can be controlled.

The variable-frequency circuit 622 of the VFD 62 further includes an external communication end 627. The external communication end 627 receives externally input simulated amounts in order to control the rotating speed of the electrical unit main body 61. The rotating speed will be modified by preset VFD program parameters so that the feeding speed of the stock feeder matches the woodworking equipment with which the stock feeder is used. With the external communication end 627 being controllable from the outside, synchronous and comprehensive control can be achieved.

In addition, the outer surface of the second housing 620 of the VFD 62 is provided with a plurality of alternately arranged heat dissipating ribs 628 and heat dissipation slots 629. The heat dissipation slots 629 of the VFD 62 correspond in position to and are in communication with the heat dissipation grooves 612 of the electrical unit main body 61. Hence, once the power fan 613 begins operation, the fan-driven air flow will dissipate the heat in the heat dissipation slots 629 of the VFD 62 while being discharged through the heat dissipation grooves 612. Now that the power fan 613 can work independently to dissipate heat from the electrical unit main body 61 and the VFD 62 at the same time, heat dissipation can be carried out effectively and economically. Furthermore, both the second housing 620 and the cover 621 are made of an aluminum alloy, which not only is sturdy and highly resistant to damage, but also dissipates heat rapidly.

Figure 10:
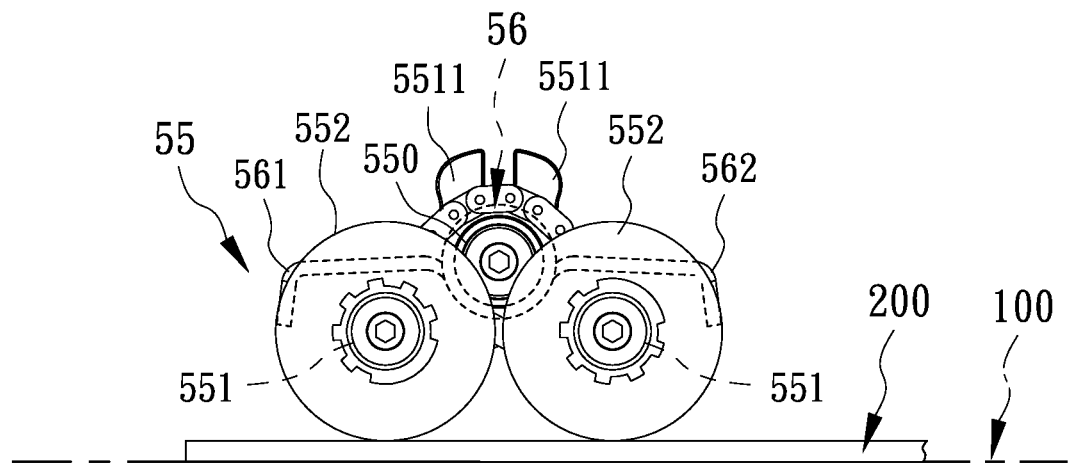
FIG. 10 is a side view illustrating a free state of the wheels of the feed wheel set shown in FIG. 6.

Referring to FIGS. 8 and 10, when in a free state, the axles 551 of each feed wheel set 55 not only flank the main shaft 550, but also are below the main shaft 550; in other words, the axles 551 are at a lower height than the main shaft 550. Therefore, as long as the thickness of the wood board 200 being fed is constant, the wheels 552 of the feed wheel sets 55 will remain at the height illustrated in FIG. 10.

The stock feeder of the present invention has the following effects and advantages:

1. With the VFD, the present invention allows infinite speed variation and thereby overcomes the 8-stage 8-speed limitation of the gear set in a conventional stock feeder.

2. The second housing and the cover of the VFD are fastened together to seal the variable-frequency circuit inside. Thus, optimal dust resistance and protection can be achieved, with an IP code not lower than IP54.

3. The aluminum-alloy second housing and cover feature high heat-dissipation efficiency and structural stability.

4. The heat dissipation grooves of the electrical unit main body and the heat dissipation slots of the VFD correspond in position to one another to form independent channels through which heat dissipation can be carried out using the air blown by the same independent power fan. Therefore, not only can heat be dissipated efficiently, but also the power fan will not fail to cool the VFD even in a dusty environment.

5. The external communication end in the variable-frequency circuit enables comprehensive control in synchronization with other mechanisms.

6. The feeding unit has an elastic lifting mechanism to be driven by an external force. If the wood board being fed has uneven thickness, or if the wood board to be fed has a different thickness than the one being fed, the cushioning and protective effect of the elastic elements will keep the gears from an undue force which may otherwise break the gears. Consequently, the service lives of the feed wheel sets are expected to last longer than is conventionally allowed.

7. The driving elements in the gear set are transmission chains, which not only have a much smaller deformation allowance than belts, but also help increase the intensity of mechanical movement. Compared with belts, the transmission chains are more resistant to wear and tear and have longer service lives.

The present invention has been described via the detailed illustration of the embodiments. Those skilled in the art can derive variations from the embodiments without departing from the scope of the present invention. Therefore, the embodiments shall not limit the scope of the present invention defined in the claims.

What is claimed is:

1. A stock feeder for woodworking equipment, comprising:
 a base;
 a cross clamp having a horizontal clamping sleeve and a vertical clamping sleeve;
 a horizontal bar unit extending through the horizontal clamping sleeve;
 a vertical bar unit extending through the vertical clamping sleeve and having a bottom end installed on the base;
 a feeding unit pivotally provided at an end of the horizontal bar unit, the feeding unit comprising a unit body and a plurality of feed wheel sets disposed in a bottom portion of the unit body, each said feed wheel set having a main shaft, two axles respectively and pivotally connected to two lateral sides of the main shaft and parallel to the main shaft, two wheels respectively and fixedly provided at front ends of the axles, a plurality of gears fixedly provided on the main shaft and on the axles, and a plurality of transmission elements mounted around the gears; and an electrical unit for driving the feed wheel sets of the feeding unit to rotate and thereby carry out a feeding operation, the electrical unit having an electrical unit main body and a variable-frequency drive (VFD) provided on a lateral side of the electrical unit main body, the electrical unit main body having a first housing, a plurality of heat dissipating fins and heat dissipation grooves alternately arranged on an outer periphery of the first housing, a power fan independently mounted on a top portion of the first housing, and a fan cover covering the power fan, the power fan being in communication with the heat dissipation grooves, the VFD having a second housing, a variable-frequency circuit sealed in the second housing, and a control panel exposed outside the second housing, the second housing having an outer surface provided with a plurality of alternately arranged heat dissipating ribs and heat dissipation slots, the heat dissipation slots corresponding in position to and being in communication with the heat dissipation grooves of the electrical unit main body.

2. The stock feeder of claim 1, wherein the feeding unit further comprises a plurality of elastic elements each mounted around the main shaft of a said feed wheel set, each said elastic element having a front end and a rear end respectively pressing against the two axles respectively and pivotally connected to the two lateral sides of the main shaft of a said feed wheel set.

3. The stock feeder of claim 1, wherein the VFD further has a cover closed on and fastened to the second housing, and the control panel is exposed on the cover.

4. The stock feeder of claim 1, wherein the variable-frequency circuit of the VFD has an external communication end.

5. The stock feeder of claim 1, wherein the feeding unit further comprises a plurality of casings each enclosing a said transmission element of a said feed wheel set.

6. The stock feeder of claim 5, wherein each said casing is assembled from a first casing portion and a second casing portion engaged with each other.

7. The stock feeder of claim 6, wherein the first casing portion of each said casing has two through holes and has at least a fastening lug and at least an engaging block at an opening of the first casing portion, and the second casing portion of each said casing has two through holes and has at least an engaging block and at least a fastening lug at an opening of the second casing portion.

8. The stock feeder of claim 1, wherein the feeding unit further comprises a protective cover covering both the feed wheel sets and a gear set, the gear set comprising a primary gear, a secondary gear, and a plurality of driving elements, the driving elements being respectively connected to the secondary gear and the gears of the feed wheel sets.

9. The stock feeder of claim 1, wherein each said axle of each said feed wheel set has a plurality of outwardly extending axle plates, each said axle plate having an axle hole, each said axle being mounted around a said main shaft through the axle holes of corresponding said axle plates.

10. The stock feeder of claim 1, wherein in each said feed wheel set, the axles not only flank the main shaft, but also are below, and hence at a lower height than, the main shaft.

11. The stock feeder of claim 1, wherein the transmission elements of each said feed wheel set are transmission chains, each said transmission chain being composed of a plurality of links sequentially linked together.

12. The stock feeder of claim 1, wherein the driving elements of the gear set are transmission chains.

* * * * *